United States Patent [19]
Babel et al.

[11] Patent Number: 4,998,852
[45] Date of Patent: Mar. 12, 1991

[54] ATTACHMENT TOOL FOR MACHINE TOOLS SUCH AS MILLING MACHINES

[75] Inventors: Werner Babel; Walter Schwarz, both of Pfronten, Fed. Rep. of Germany

[73] Assignee: Maho Aktiengesellschaft, Fed. Rep. of Germany

[21] Appl. No.: 454,074

[22] Filed: Dec. 21, 1989

[30] Foreign Application Priority Data

Dec. 21, 1988 [DE] Fed. Rep. of Germany ... 8815854[U]

[51] Int. Cl.$^5$ .............................................. B23C 1/00
[52] U.S. Cl. .................................. 409/144; 409/201; 409/230
[58] Field of Search ............... 409/144, 201, 204, 215, 409/230

[56] References Cited

U.S. PATENT DOCUMENTS

| | | |
|---|---|---|
| 642,355 | 1/1900 | McLeod . |
| 3,690,220 | 9/1972 | Escobedo ............................ 409/144 |
| 4,378,621 | 4/1983 | Babel ................................... 409/144 |
| 4,557,645 | 12/1985 | Marsland ............................. 409/144 |
| 4,709,455 | 12/1987 | D'Andrea et al. .................. 409/144 |

FOREIGN PATENT DOCUMENTS 1752611 12/1970 Fed. Rep. of Germany .
3131753 2/1983 Fed. Rep. of Germany .

Primary Examiner—Daniel W. Howell
Attorney, Agent, or Firm—Baker, Maxham, Jester & Meador

[57] ABSTRACT

A machining tool, in particular a polishing head and its attachment to mount it to the spindle housing of a milling machine. The invention provides the machining tool with an adapter arranged on the front side of the spindle housing to which the housing of the machining tool is attached, sluable on a transverse plane at a right angle to the spindle axis. The adapter has a coupling for the rotary connection to the horizontal work spindle as well tension devices to compensate for play.

21 Claims, 2 Drawing Sheets

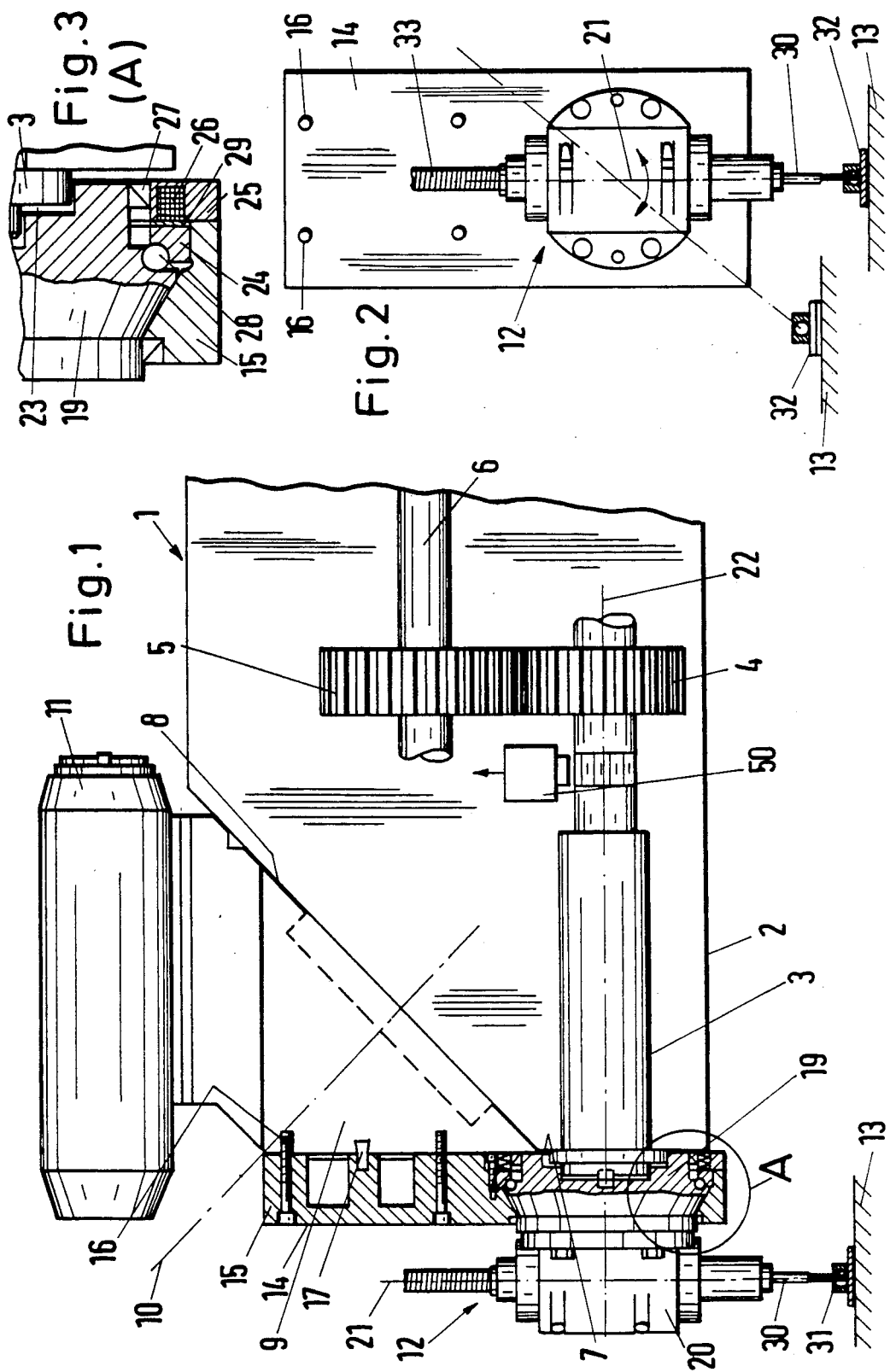

ATTACHMENT TOOL FOR MACHINE TOOLS SUCH AS MILLING MACHINES

FIELD OF THE INVENTION

This invention generally concerns a machining tool, and more particularly a polishing head or a similar tool and the means for attachment to the spindle housing of a milling machine

BACKGROUND OF THE INVENTION

One of the goals when developing contemporary machine tools and machining centers is to allow for as many different machining processes as possible in one setting on a workpiece. The means to achieve this most often is through the use of a magazine with preprogrammed exchangeable units, which feed the work spindle with various tools and/or the work bench with paletted workpieces according to the preprogrammed process. Some types of finishing, such as the fine machining of the surfaces of workpieces (planishing, scraping, polishing) are not easily integrated into program controlled machining processes of finishing workpieces. This is particularly true because fine and finest machining of surfaces of workpieces take a long time during which the machine tool cannot be used for other machining processes.

For this reason special machines have had to be used for fine machining of workpiece surfaces and similar finishing processes. However, there are extended quiet periods in every plant during which the entire machine center is used only partly or not at all, as for example during night shifts, on weekends and holidays

SUMMARY OF THE INVENTION

It is a major purpose of the invention to create a machining tool, such as a polishing head or a similar tool, which can be easily attached to a spindle housing of a milling machine and which allows for various machining processes on a workpiece with the aid of the machine native drive as well as its own drive.

To achieve this purpose the invention provides an adapter which can be mounted on the front side of the spindle housing. The housing of the machining tool is attached to this adapter on a transverse plane at a right angle to the spindle axis, sluable with the aid of the work spindle.

The invention further allows for a more extensive use of a program controlled milling machine for the lengthy machining of surfaces as well as of complex shaped workpieces. The machining tool is attached to the spindle head at the beginning of extended break periods and machining proceeds during this otherwise quiet time with the aid of the machine's own program control.

When swinging the tool housing in certain predetermined angular positions by means of the drive of the work spindle, errors in positioning can occur due to the normally existing play in the drive of the work spindle. In order to avoid such errors in positioning the invention provides tension devices which are placed between the adapter outer cover and the rotating disc within it, which disc is rotatable by means of the work spindle The tension devices compensate for the play in the drive of the work spindle and allow for a swinging motion of the machining tool without jolts, as well as for a secure positioning of the machining tool in a set angular position. These tension devices can contain an end ring attached to the outer cover, within which pressure units in the form of magnetic coils or pressure springs are positioned. The magnetic coils or pressure springs push against the bearing ring of a roller bearing for the rotating disc and/or as well against the rotating disc with adjustable pressure.

In a particularly effective design the machining tool according to the invention can be mounted on the front side of the spindle head, in the lower part of which the horizontal work spindle is arranged The machine tool has a swivel head on a sloping surface at an angle of 45° above the horizontal spindle. The swivel head contains a vertical surface which is sluable between an upper resting position and an operating position. The adapter of the invention includes a rigid mounting plate, the lower portion of which, opposite to the horizontal spindle, is formed with a partly conical opening for the positioning of a rotating disc. The upper part of the adapter is attached to the free area of the vertical surface of the swivel head.

The machining tool according to the invention allows for fine machining of workpiece surfaces by means of the planishing or rotating action of a friction tool. In order to make fine machining of larger surfaces of workpieces possible, it is effective to fasten a plate-shaped tool to a universal joint at the end of a shaft which is aligned transverse to the spindle axis. This tool performs rotating, circulating or translatory motions on the workpiece surface.

BRIEF DESCRIPTION OF THE DRAWING

The objects, advantages and features of the invention will be more readily perceived from the following detailed description when read in conjunction with the accompanying drawing, in which:

FIG. 1 schematically depicts the front part of a spindle head of a universal milling machine with a swivel head and an attached machining tool, partly in section, in accordance with the invention;

FIG. 2 is a front view of the machining tool of FIG. 1;

FIG. 3 is an enlargement of area A of FIG. 1; and

DESCRIPTION OF THE PREFERRED EMBODIMENTS

Figure 4A:
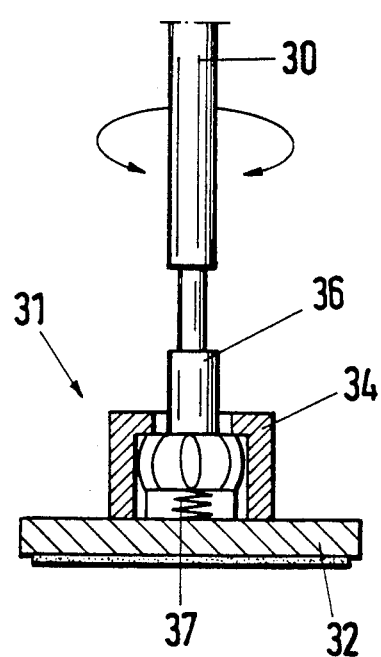
FIGS. 4 and 5 show various alternative embodiments for a portion of the machining tool.

Spindle head 1 according to FIG. 1 is adjustably mounted horizontally on a machine tool frame (not shown). Horizontal work spindle 3 is set in the lower part of spindle housing 2. The work spindle is driven through spur wheel pair 4 and 5 from main shaft 6 by the machine tool drive (not shown), normally consisting of an electromotor and a gear box. The work spindle's front connecting end slightly protrudes through vertical front wall 7 of spindle housing 2. Above this vertical front wall is sloping surface 8 at an angle of 45° on top of which swivel head 9 is positioned, which rotates around 45°-axis 10. This swivel head is positioned so that it rotates on sloping surface 8 through corresponding guiding and adjusting devices. In the position depicted in FIG. 1 another milling head 11 is mounted on the top horizontal surface of swivel head 9, the individual parts of which do not protrude into the working area in the front of the spindle housing in this resting position. Such a spindle head is conventional and is described in German patent 2,944,983.

A machining tool 12 for finishing surfaces of a workpiece is attached to the front side of spindle head 1 by means of adapter 14. In the depicted embodiment adapter 14 includes nondeformable bearing plate 15 which is fastened to the vertical front side of swivel head 9 by means of several bolts 16 and dowel pins 17. Rotating disc 19 is placed in a circular opening of the lower part of the bearing plate which is adjacent to the protruding end of the horizontal work spindle. Housing 20 of the machining tool is mounted on the protruding front side of the rotatable disc. Roll axis 21 of this tool runs along a plane at a right angle to roll axis 22 of the work spindle.

Work spindle 3 and its protruding end interlocks with cutout 23 in rotating disc 19 so that when this work spindle is turned or rotated, the rotating disc 19 along with the attached machining tool 12 are moved to different angular orientations.

As apparent from FIG. 3, which enlarges area A of FIG. 1, rotating disc 19 has immediately behind its conical section an annular bearing surface for a ring or race of balls 28, which are held in place by bearing ring 24 in the recess of the bearing plate. Tuning or spacer disc 29 is positioned between this bearing ring 24 and end ring 25. Several pressure devices 26, for example, pressure springs or electromagnets, or both, are arranged in endring 25. The end ring is fastened to bearing plate 15 by means of a tension rod (not shown). These pressure devices 26 push against bearing ring 24 through spacer disc 29. Distance washer or gasket ring 27 is arranged between the cylindrical end part of rotating disc 19 and the inner circumference area of end ring 25.

With further reference to FIG. 1, work spindle 3 is connected with disc 19 through the interlocking of its protruding end with correspondingly designed cutout 23 of rotating disc 19 for rotation therewith. Machining tool 12 is swung into the desired angular position by a program controlled turning of work spindle 3 by means of its drive, as indicated by the dotted line in FIG. 2. The angle of swing is detected by goniometer 50 (FIG. 1), which can be coupled with main shaft 6 or, as depicted, with work spindle 3. The goniometer transmits angular position signals to the machine's program control.

A drive motor is including in housing 20 of the machining tool, the output shaft of which is connected with shaft 30 through appropriate gears. The pneumatic or electric drive motor can move shaft 30 and, by means of a universal joint connection, disc shaped tool 32, in a rotary or swinging motion and derives its supply of compressed air or electricity through connector 33 (FIG. 2).

Figure 4B:
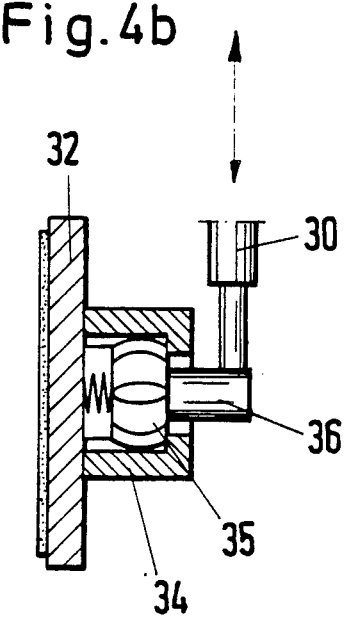

According to the desired type of finishing of the surface, different tools can be used. In the embodiments of FIGS. 4a and 4b attached to tool disc 32, which contains a grinding, polishing, or lapping surface, is case 34 which forms part of the universal joint. Case 34 encloses rotation connected and flexible spherical segment 35, which is fastened to shaft 30 by means of sleeve 36 and is supported by spring 37 on the inside of the case and bearing against tool disc 32. Two possible types of connection and flexibility of the tool disc are depicted in FIGS. 4 and 5.

Figure 5A:
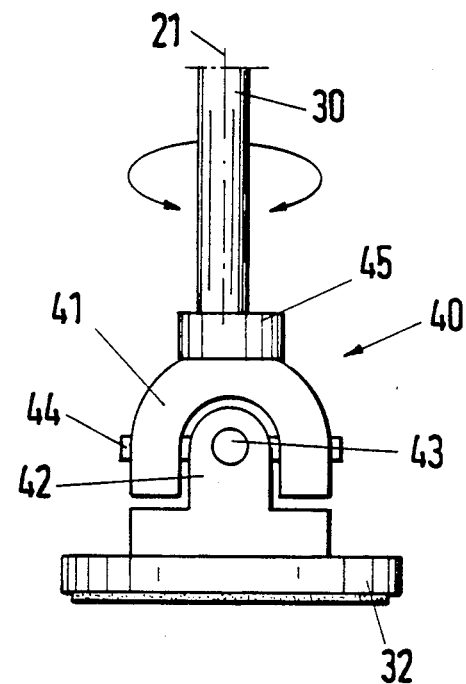
Figure 5B:
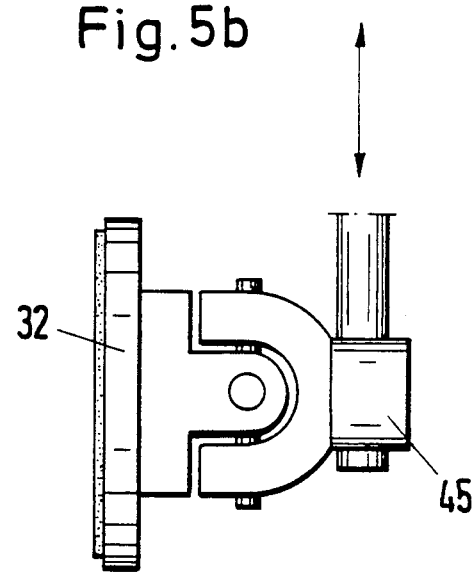

The universal joint of the tool design according to FIGS. 5a and 5b is a so-called Cardan joint 40 with two meshing yokes 41 and 42 at right angles to each other, which are set on bolts 43 and 44 crossing at a right angle. In FIG. 5a shaft 30 is positioned eccentrically in sleeve 45, thereby the tool disc 32 performs a circular motion around the shaft axis 21. In the position according to FIG. 5b tool shaft 30 is positioned in a transverse bore of sleeve 45 and the tool performs a translatory swinging motion.

The invention is not restricted to the above mentioned embodiments. Adapter 14 can have a different mounting device for rotating disc 19 with tension devices, as opposed to the described bearing plate 15. This other mounting device could be attached to a conventional spindle head without a swivel head. However, it is essential that the swing of machining tool 12, as depicted in FIG. 2, around the spindle axis 22, which is arranged at a vertically low level in the machine tool, occurs practically free of play by means of the horizontal work spindle and its program controlled drive. Various finishing tools, such as polishing heads or devices for electroerosive or ultrasonic finishing of coated workpieces, can be connected to attached adapter 14.

In view of the above description, it is likely that modifications and improvements will occur to those skilled in the art which are within the scope of the appended claims.

What is claimed is:

1. A machining tool attachment to the spindle housing of a milling machine having a program control, the spindle housing having a swivel head with a front surface, and a horizontal work spindle, said attachment comprising:

adapter means mounted to the front surface of the spindle housing;

a machining tool housing having a machining tool and an axis and being coupled to said adapter means, said tool housing being sluable with respect to said adapter, said tool housing axis being oriented at a right angle to the axis of the work spindle; and means for coupling said machining tool housing to the work spindle for controlled rotation therewith in accordance with the program control of the milling machine.

2. The machining tool attachment recited in claim 1, wherein said coupling means comprises:

disc means rotatably mounted in said adapter means; and tension means for compensating for any play which may otherwise exist in the coupling between the work spindle and said disc.

3. The machining tool attachment recited in claim 2, wherein said adapter means comprises a bearing plate mounted to the spindle housing;

said machining tool housing being transversely mounted to said disc for angular reorientation of said machining tool housing axis upon rotation of said work spindle.

4. The machining tool attachment recited in claim 1, where said tool housing has a drive motor therein, a shaft extending outwardly of said tool housing from said drive motor and a flexible coupling for attaching the machining tool to said shaft.

5. The machining tool attachment recited in claim 2, where said tool housing has a drive motor therein, a shaft extending outwardly of said tool housing from said drive motor and a flexible coupling for attaching the machining tool to said shaft.

6. The machining tool attachment recited in claim 3, where said tool housing has a drive motor therein, a shaft extending outwardly of said tool housing from said drive motor and a flexible coupling for attaching the machining tool to said shaft.

7. The machining tool attachment recited in claim 1, wherein:
said adapter means comprises a rigid bearing plate, the upper part of which is mounted to the front surface of said swivel head, and being formed in its lower part with a conical opening;
said coupling means comprises disc means shaped and configured to be received in said conical opening.

8. The machining tool attachment recited in claim 2, wherein:
said adapter means comprises a rigid bearing plate, the upper part of which is mounted to the front surface of said swivel head, and being formed in its lower part with a conical opening;
said disc means being shaped and configured to be received in said conical opening.

9. The machining tool attachment recited in claim 3, wherein;
said bearing plate is rigid, the upper part of which is mounted to the front surface of said swivel head, and being formed in its lower part with a conical opening;
said disc means being shaped and configured to be received in said conical opening.

10. The machining tool attachment recited in claim 4, wherein;
said adapter means comprises a rigid bearing plate, the upper part of which is mounted to the front surface of said swivel head, and being formed in its lower part with a conical opening;
said coupling means comprises disc means shaped and configured to be received in said conical opening.

11. The machining tool attachment recited in claim 2, wherein said tension means comprise:
an end ring connected to said adapter means;
angularly spaced pressure units bearing on said end ring;
a spacer disc juxtaposed with said pressure units around said end ring;
a bearing ring in pressure contact with said spacer disc; and
a plurality of ball bearings confined between said bearing ring and said disc means.

12. The machining tool attachment recited in claim 3, wherein said tension means comprise:
an end ring connected to said adapter means;
angularly spaced pressure units bearing on said end ring;
a spacer disc juxtaposed with said pressure units around said end ring;
a bearing ring in pressure contact with said spacer disc; and
a plurality of ball bearings confined between said bearing ring and said disc means.

13. The machining tool attachment recited in claim 4, wherein said tension means comprise:
an end ring connected to said adapter means;
angularly spaced pressure units bearing on said end ring;
a spacer disc juxtaposed with said pressure units around said end ring;
a bearing ring in pressure contact with said spacer disc; and
a plurality of ball bearings confined between said bearing ring and said disc means.

14. The machining tool attachment recited in claim 5, wherein said tension means comprise:
an end ring connected to said adapter means;
angularly spaced pressure units bearing on said end ring;
a spacer disc juxtaposed with said pressure units around said end ring;
a bearing ring in pressure contact with said spacer disc; and
a plurality of ball bearings confined between said bearing ring and said disc means.

15. The machining tool attachment recited in claim 11, wherein said pressure units are pressure springs.

16. The machining tool attachment recited in claim 11, wherein said pressure units are electromagnets.

17. The machining tool attachment recited in claim 4, wherein the machining tool is disc-shaped for fine machining of workpiece surfaces and said flexible coupling is a universal joint.

18. The machining tool attachment recited in claim 5, wherein the machining tool is disc-shaped for fine machining of workpiece surfaces and said flexible coupling is a universal joint.

19. The machining tool attachment recited in claim 6, wherein the machining tool is disc-shaped for fine machining of workpiece surfaces and said flexible coupling is a universal joint.

20. The machining tool attachment recited in claim 10, wherein the machining tool is disc-shaped for fine machining of workpiece surfaces and said flexible coupling is a universal joint.

21. The machining tool attachment recited in claim 13, wherein the machining tool is disc-shaped for fine machining of workpiece surfaces and said flexible coupling is a universal joint.

* * * * *